Jan. 12, 1971  R. W. HILTON  3,553,998
SELF-CENTERING DIE SYSTEM FOR PRECISION EXTRUSION OF GUN TUBES
Filed Feb. 14, 1968
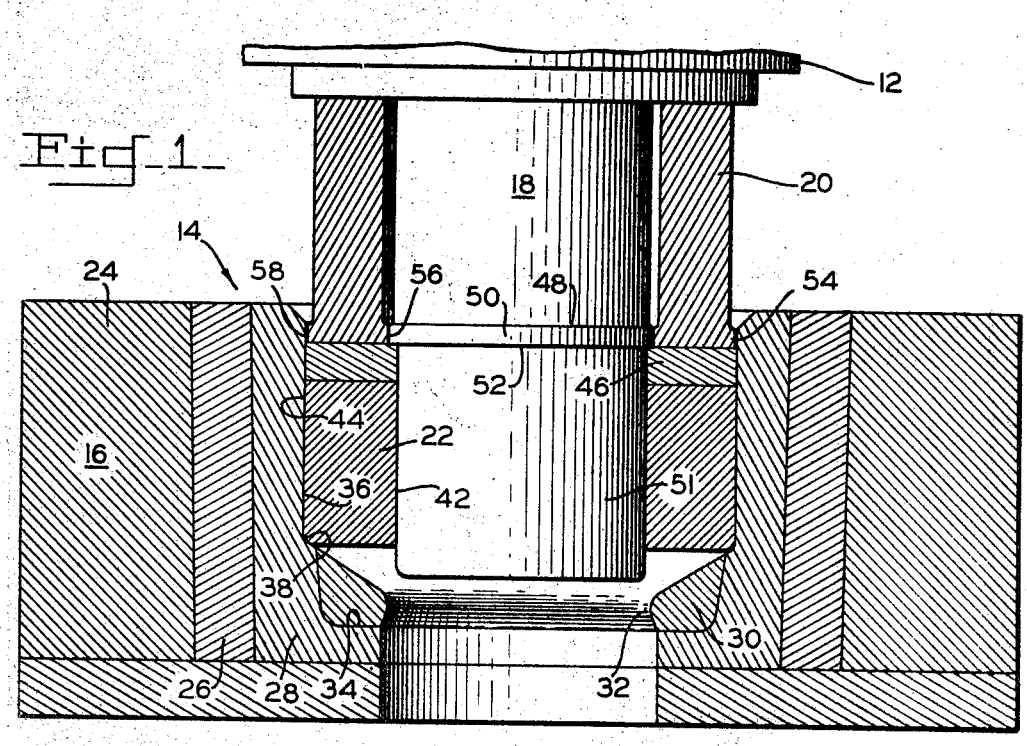
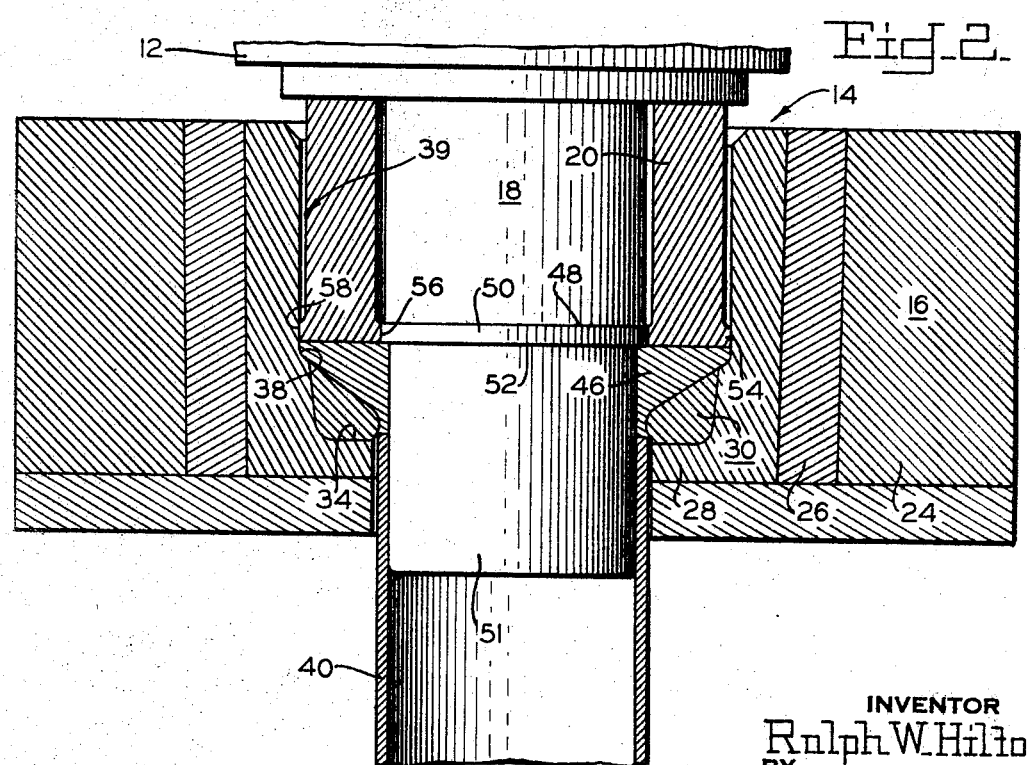
INVENTOR
Ralph W. Hilton
BY
ATTORNEY

United States Patent Office 3,553,998
Patented Jan. 12, 1971

3,553,998
SELF-CENTERING DIE SYSTEM FOR PRECISION EXTRUSION OF GUN TUBES
Ralph W. Hilton, Torrance, Calif., assignor, by mesne assignments, to the United States of America as represented by the Secretary of the Army
Filed Feb. 14, 1968, Ser. No. 705,389
Int. Cl. B21c 25/06
U.S. Cl. 72—266　　　　　　　　　　　　　　　　3 Claims

ABSTRACT OF THE DISCLOSURE

The mandrel in an extrusion system for forming tubes is centered respective to the extrusion die through the expansion of a flange of the hollow stem into joint contact with the mandrel and die while transmitting pressure to a machined hollow billet for extrusion therebetween.

---

With the development of the extrusion process of forming tubes from high strength metals efforts have been attempted to use the process for forming gun barrels as it would speed up considerably the time of manufacture as well as provide a considerable saving of material that might be critical in times of war.

Up to the present invention it has not been possible to form a gun barrel by extrusion within those tolerances which are required in gun barrel designs and which, hitherto, could be achieved only through the use of machine processes. With the present invention, however, gun barrels can be uniformly formed by extrusion within those tolerances established for machine operations and with a considerable saving of time and critical material. This precision is achieved through a die system in which a self-centering principle is effectively introduced during extrusion whereby the concentricity of the inside and outside diameters of the barrel are maintained with a remarkable accuracy.

The specific nature of the invention as well as other advantages thereof will clearly appear from a description of a preferred embodiment as shown in the accompanying drawing in which:

FIG. 1 is a schematic, longitudinally cross-sectioned view of the extrusion die system showing the press ram in its upper free position and a billet installed in the extrusion die ready for extrusion; and FIG. 2 is a view similar to FIG. 1 but shows the ram adjacent its down position and a tube extruded from the billet.

Shown in the figures is a press ram 12 for energizing extrusion die system 14 which consists of an extrusion die 16, a cooperating mandrel 18 and a cylindrical hollow stem 20 for transferring the energy in the ram to a heated billet 22 in the extrusion die for extrusion therefrom. Mandrel 18 and hollow stem 20 are coaxially secured to ram 12 for injection thereby into extrusion die as hereinafter explained.

Extrusion die 16 includes an outer cylinder 24, an intermediate cylinder 26 and a liner 28 which are in a nesting arrangement and a nib 30 with a throat 32. Outer cylinder 24 and intermediate cylinder 26 are dimensionally designed to effect an interference fit therebetween which will produce a compressive hoop stress in the intermediate cylinder at its boundary with liner 28 in excess of 100% of the pressure applied thereto during extrusion of billet 22. It is understood that the components of extrusion die 16 are fabricated from suitable tool steels and are hardened to suit the stress requirements of the extrusion die during the extrusion operation.

Nib 30 is received by a seat 34 formed in liner 28 adjacent the bottom end thereof and because of the hoop stress produced in extrusion die 16 the nib is held diametrically during the extrusion operation. The inside wall of liner 28 is increased in diameter above seat 34 at 36 and such inside wall is precisely machined as to concentricity, straightness and surface finish. Seat 34 is formed so that throat 32 of nib 30 is coaxial respective to the extended axis of inside wall 36. Inside wall 36 and shoulder 38 that terminates the lower boundary thereof form a receptacle 39 for billet 22 from which a tube 40 is to be formed.

Before heated and placed in receptacle 39, billet 22, which is of ring configuration, is precisely machined so that the inside and outside diameters are concentric within close tolerances and the inside and outside surfaces, noted at 42 and 44 respectively, are without striations. The outside diameter of billet 22 is approximately the same as that of inside wall 36 of receptacle 39. After installation of billet 22 into receptacle 39, a butt ring 46 of less critical metal is placed on top of the billet for a push through function so that the full billet can be extruded without waste, as seen in FIG. 2, and so as to provide an insulation between the worked material and hollow stem 20.

Mandrel 18 is cylindrical in configuration with a circumferential rib 48 located between the opposite ends thereof. Rib 48 is provided with an outside surface 50 which is coaxial with the axis of mandrel 18 and is arranged to cooperate with hollow stem 20, as hereinafter described, to center mandrel 18 respective to extrusion die 16 during the extrusion operation. The portion of mandrel 18 disposed below rib 48 functions as a former section 51 which has a diameter essentially the same as that of the inside diameter of billet 22 so as to be snugly received thereby. When bottom shoulder 52 of rib 48 rests on top butt ring 46, as shown in FIG. 1, former section 51 extends all the way through billet 22 with its bottom end located adjacent throat 32 ready for projection therethrough when press ram 12 is energized.

The bottom lip of hollow stem 20 is increased in cross-section as a flange 54 which flares inwardly to form an inner face 56 and outwardly to form an outer face 58 which are both coaxial with the axis of the hollow stem. Mandrel 18 and hollow stem 20 are so related that when both are secured to ram 12 flange 54 is aligned with rib 48 so that inner face 56 is contactable with outside surface 50. Outer face 58 is sliding engageable with inside wall 36 of receptacle 39.

Extrusion die 16, mandrel 18 and hollow stem 20 are so related that when ram 12 is in its upper free position and no pressure is applied by the hollow stem to billet 22, flange 54 has loose contact with rib 48 and inside wall 36 but when extrusion pressure is applied to the hollow stem during the extrusion stroke of the ram and the flange is expanded the flange engages both the rib and the inner surface with sufficient pressure to center mandrel 18 relative to the inner surface during the extrusion operation. Thus, with mandrel 18, which forms the inside of tube 40, being held centered relative to inside wall 36 and throat 32, which forms the outside of the tube, being coaxial with such inside wall, the inside and outside diameters of the tube are concentrically formed when ram 12 is energized downwardly. Mandrel 18 is further held centered respective to extrusion die 16 by the precise coaxial machining of inside and outside surface 42 and 44 of billet 22, whereby the mandrel is maintained coaxial with throat 32 at another area, spaced from rib 50, by the even flow of the material of the billet between the throat and former section 51 as the former section is advanced through the throat during the extrusion stroke.

Flange 54 is to be dimensioned between inner face 56 and outer face 58 so that only sufficient pressure is made upon inside wall 36 and outside surface 50 of rib 48 when the flange is expanded by extrusion pressure to hold mandrel 18 centered relative to extrusion die 16. Excessive pressure by flange 54 would cause galling of inside wall 36 and outer face 58 during the extrusion stroke of ram 12. If found desirable, former section 51 may be tapered slightly to facilitate removal thereof from tube 40 after it is formed.

The present invention has been described in detail above for the purpose of illustration only and is not intended to be limited by this description or otherwise except as defined by the scope of the appended claims.

I claim:

1. A die system for extruding a gun tube from a ring shaped billet, said die system including an extrusion die for holding a billet and forming the outside of the tube as the billet is forced therefrom, said extrusion die including a cylindrical liner, a receptacle formed in said liner to receive the billet, an inner wall of said receptacle, a nib seated in said liner below said receptacle, a throat of said nib disposed in coaxial relationship with said inner wall, and a plurality of cylinders nested together around said liner with an interference fit to prevent diametrical displacement of said nib during extrusion of the billet therethrough, a mandrel insertable into the billet and arranged for displacement by an energy transmitting press ram relative to said die for forming the inside of the tube, a cylindrical hollow stem disposed between the press ram and the billet coaxial with said mandrel and said extrusion die for tranforming displacement of the press ram to the billet for extrusion thereof between said extrusion die and said mandrel as said mandrel is moved relative thereto, a flange on said hollow stem expandable by pressure applied thereby to the billet into joint tight fitting engagement with said mandrel and said extrusion die for centering said mandrel relative thereto during extrusion of the billet said mandrel being cylindrical in configuration and including an annular rib formed therearound between opposite ends thereof, an outer surface of said rib formed coaxial with the axis of said mandrel and disposed for tight fitting engagement by said flange when expanded to center said mandrel respective to said throat during extrusion of the billet, and a former section formed on one side of said rib coaxial with said outer surface disposed for displacement through said throat with the billet to form the inside of the tube.

2. The die system as defined in claim 1 wherein said flange is formed around the lip of said hollow stem which is adjacent the billet and is provided with an inner face engageable with said outer surface of said rib and an outer face slidingly engageable with said inner wall when said flange is expanded.

3. The die system as defined in claim 2 and including in cooperation therewith an inside surface and an outside surface of the billet, said inside and outside surfaces being machined for precise coaxial relationship to provide even flow of the billet between said throat and said former section and thereby assist in holding said former section centered respective to said throat during extrusion of the billet therethrough.

References Cited

UNITED STATES PATENTS

| | | | |
|---|---|---|---|
| 2,337,804 | 12/1943 | Dempsey | 207—10.21 |
| 2,903,130 | 9/1959 | Reichl | 207—10.21 |
| 3,178,925 | 4/1965 | Nolan et al. | 72—364 |
| 3,303,684 | 2/1967 | Starr et al. | 72—273 |
| 3,074,549 | 1/1963 | Kent | 72—265 |
| 3,114,688 | 12/1963 | Wyatt | 72—264 |
| 941,365 | 11/1909 | Hine | 72—273X |

RICHARD J. HERBST, Primary Examiner

A. L. HAVIS, Assistant Examiner

U.S. Cl. X.R.

72—273